(12) United States Patent
Galmiche et al.

(10) Patent No.: US 11,962,197 B2
(45) Date of Patent: Apr. 16, 2024

(54) ROTOR WITH NON-THROUGH SHAFT, ASSEMBLY OF ROTORS, ROTOR WITH MULTIPLE MAGNETIC MASSES AND ASSOCIATED ROTARY ELECTRICAL MACHINE

(71) Applicant: GE Energy Power Conversion Technology Limited, Warwickshire (GB)

(72) Inventors: Christophe Galmiche, Toul (FR); Jean-Francois Pradurat, Brignoles (FR); Fabien Roche, Blenod les Toul (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 196 days.

(21) Appl. No.: 16/576,741

(22) Filed: Sep. 19, 2019

(65) Prior Publication Data
US 2020/0112216 A1   Apr. 9, 2020

(30) Foreign Application Priority Data
Oct. 3, 2018   (FR) .................................. 1859169

(51) Int. Cl.
*H02K 1/30* (2006.01)
*H02K 7/00* (2006.01)
*H02K 16/02* (2006.01)

(52) U.S. Cl.
CPC .............. *H02K 1/30* (2013.01); *H02K 7/003* (2013.01); *H02K 16/02* (2013.01)

(58) Field of Classification Search
CPC .. H02K 1/28; H02K 1/30; H02K 7/16; H02K 17/16; H02K 17/165; F16D 1/003; F16D 1/076
USPC .................... 310/216.066, 216.067, 216.122
See application file for complete search history.

(56) References Cited

U.S. PATENT DOCUMENTS

| | | | | |
|---|---|---|---|---|
| 2,006,172 A | * | 6/1935 | Klappauf | H02K 16/00 310/166 |
| 2,676,279 A | * | 4/1954 | Wilson | H02K 7/003 403/337 |
| 4,019,344 A | * | 4/1977 | Calistrat | F16D 3/185 464/154 |
| 4,614,888 A | * | 9/1986 | Mosher | H02K 1/28 310/216.122 |
| 6,177,750 B1 | * | 1/2001 | Tompkin | H02K 1/28 310/211 |

(Continued)

FOREIGN PATENT DOCUMENTS

| | | |
|---|---|---|
| DE | 102006047186 A1 | 4/2008 |
| EP | 0509119 A1 * | 10/1992 |

(Continued)

OTHER PUBLICATIONS

Heil, Machine Translation of EP0509119, Oct. 1992 (Year: 1992).*

*Primary Examiner* — Eric Johnson
(74) *Attorney, Agent, or Firm* — WOOD IP LLC

(57) ABSTRACT

The rotor with a non-through shaft for an electrical machine comprises a cylindrical magnetic mass gripped between two half-shafts each comprising a mounting flange connected to the magnetic mass.
Each half-shaft is made in a single piece and comprises a coupling flange located opposite the mounting flange.

15 Claims, 12 Drawing Sheets

(56) References Cited

U.S. PATENT DOCUMENTS

| | | | |
|---|---|---|---|
| 6,441,532 B1* | 8/2002 | Ahrens | H02K 1/26 |
| | | | 310/211 |
| 2004/0189126 A1 | 9/2004 | Brunet et al. | |
| 2008/0178417 A1* | 7/2008 | Hayes | A47L 11/4036 |
| | | | 15/340.1 |
| 2009/0218898 A1 | 9/2009 | Ribeiro | |
| 2010/0253087 A1* | 10/2010 | Lauke | F03D 1/065 |
| | | | 290/55 |
| 2011/0142598 A1* | 6/2011 | Andersen | F03D 80/70 |
| | | | 415/122.1 |
| 2013/0181560 A1* | 7/2013 | Galmiche | H02K 7/085 |
| | | | 310/90.5 |
| 2014/0097721 A1* | 4/2014 | Lang | H02K 7/003 |
| | | | 310/264 |
| 2014/0232234 A1* | 8/2014 | Semenov | H02K 1/28 |
| | | | 310/216.113 |
| 2015/0123403 A1* | 5/2015 | Casazza | F03D 17/00 |
| | | | 290/44 |
| 2017/0141706 A1* | 5/2017 | Kobayashi | H02K 16/00 |
| 2018/0314784 A1* | 11/2018 | Galmiche | H02K 17/165 |
| 2019/0072080 A1* | 3/2019 | Lemma | F03D 80/70 |
| 2019/0153957 A1* | 5/2019 | Juretzek | H02K 17/165 |

FOREIGN PATENT DOCUMENTS

| | | | | |
|---|---|---|---|---|
| EP | 0609645 A1 | | 8/1994 | |
| EP | 3048701 A1 | | 7/2016 | |
| EP | 3048703 A1 | * | 7/2016 | G06F 30/30 |
| GB | 1150876 A | | 5/1969 | |

\* cited by examiner

ROTOR WITH NON-THROUGH SHAFT, ASSEMBLY OF ROTORS, ROTOR WITH MULTIPLE MAGNETIC MASSES AND ASSOCIATED ROTARY ELECTRICAL MACHINE

The present invention relates to rotary electrical machines and more specifically relates to an electrical rotary machine comprising a non-through shaft.

The present invention also relates to an assembly of several rotors, a rotor with multiple magnetic masses and a rotary electrical machine comprising such an assembly of rotors or such a rotor.

FIG. 1 illustrates an exemplary industrial facility according to the prior art comprising a rotary electrical machine 1 comprising a rotor 2 with a through shaft or a monobloc rotor comprising a shaft and a magnetic body that are made from the same material, connected on the one hand to a gas turbine 3 by a coupling device 4, and, on the other hand, to a compressor 5 by a coupling device 6.

For example, the gas turbine produces and transmits to the rotor 2 a mechanical power of 130 MW and the electrical machine 1 generates an electrical power of 45 MW.

The compressor 5 receives by means of the rotor 2 a total power of 175 MW resulting from the sum of the mechanical and electrical powers.

As a result, the coupling device 6 is dimensioned to transmit a power of at least 175 MW.

According to the usage modes of the industrial facility, the torque transmitted by means of the coupling devices 4 and 6 is for example greater than a million N·m (Newton·meter) at a low rotation speed of less than 200 revolutions per minute, or the transmitted torque is for example less than 200000 N·m at a high rotation speed greater than 3000 revolutions per minute.

Document EP 0609645 describes a laminated rotor comprising a non-through shaft for an asynchronous electric motor.

The ends of the rotor are cylindrical and are each equipped with a coupling device.

Document U.S. Pat. No. 9,450,470B2 describes a rotor comprising two magnetic masses not comprising an opening that are connected to one another by a half-shaft, each magnetic mass comprising at a free end a cylindrical non-through half-shaft.

Documents EP3048701 and EP3048703 disclose a rotor with a non-through shaft comprising two half-shafts.

The end of one of the half-shafts comprises a single-piece coupling flange and the free end of the other half-shaft being cylindrical supporting the mass of the rotor via a bearing located at this same end.

The cylindrical half-shaft has no coupling function.

The coupling flange is fastened to another single-piece coupling flange for example positioned at the end of the shaft of the compressor 5 to transmit the required torque.

It is therefore also necessary to attach a coupling device to the end of the second shaft in order to transmit a torque to this end.

Generally, an attached coupling flange is mounted at the cylindrical end of the half-shaft, for example a coupling sleeve comprising a coupling flange.

The coupling flange is mounted on the shaft for example by brazing, keying or hydraulic brazing of the coupling flange on a conical end of the shaft.

The coupling of the rotor first requires making the coupling sleeve comprising a coupling flange then mounting the obtained assembly on the shaft.

The operations to produce the flange and for mounting on the shaft require specific machining phases of the flange and the shaft.

These operations require costly fine machining allowances on the attached coupling flange and on the end of the shaft receiving the coupling flange.

Furthermore, the shaft must be elongated to accommodate a brazing interface comprising the flange.

Since it involves an attached part, the torque transferred by the attached coupling flange is limited to prevent it from separating from the shaft and rotating around itself.

To increase the value of the torque transmissible by the attached coupling flange, the coupling flange includes flutings cooperating with flutings located at the end of the shaft.

However, the production of the fluted shaft and associated coupling flange causes additional complex machining operations that are time-consuming and costly.

Known from document U.S. Pat. No. 9,190,879 is a rotor comprising two half-shafts compacting magnetic sheets passed through by a central shaft connected to the half-shafts, the shaft keeping the magnetic sheets compacted.

The free end of each half-shaft comprises a single-piece coupling flange.

However, since the magnetic sheets comprise a central recess, and for high peripheral rotation speeds, for example of 300 m/s, mechanical stresses are concentrated around the recess and can damage the magnetic sheets.

Also known from the state of the art is a monobloc rotor comprising two shaft ends, a magnetic mass and coupling flanges connected to the shaft ends made from the same material.

However, such a rotor cannot be disassembled, the magnetic mass and the shaft being solid and monobloc.

As a result, large rotors are difficult to transport.

Furthermore, if an element of the rotor, for example an end of the shaft breaks, it is not possible to repair the rotor.

It is therefore proposed to overcome the drawbacks of rotors comprising a non-through shaft according to the state of the art, in particular by increasing the value of the torque transmissible through the rotor while limiting the number of elements of the rotor in order to limit the complexity of producing the rotor, the bulk of the rotor and by facilitating its disassembly.

In light of the preceding, the invention proposes a rotor with a non-through shaft for an electrical machine comprising a cylindrical magnetic mass gripped between two half-shafts each comprising a mounting flange connected to the magnetic mass.

Each half-shaft is made in a single piece and comprises a coupling flange located opposite the mounting flange.

According to one feature, the mounting flange and the coupling flange of a half-shaft are connected by a median shaft.

Advantageously, the median shafts have different lengths.

Preferably, the outer diameter of at least one coupling flange is smaller than or equal to the outer diameter of the magnetic mass.

Preferably, the half-shafts are identical.

Advantageously, the coupling flange comprises through holes distributed over at least a diameter to accommodate fastening means so as to transmit a torque.

According to another feature, the through holes are distributed in staggered rows over at least two different diameters of the flange.

Preferably, the through holes are alternatively smooth and tapped.

Advantageously, the magnetic mass comprises compacted magnetic sheets.

Preferably, the magnetic mass comprises a stack of metal plates.

According to another feature, the rotor with non-through shaft further comprises tie rods distributed uniformly over at least one diameter of the magnetic mass so as to keep the magnetic mass compacted between the half-shafts, the diameter of at least one median shaft being greater than the implantation diameter of the tie rods, the outer diameter of the mounting flange of said half-shaft being equal to the diameter of the median shaft, one end of each tie rod being engaged in a tapping of the median shaft comprising as many tappings as tie rods.

Preferably, the magnetic mass comprises a monobloc metal body.

Advantageously, the magnetic mass comprises a central recess.

Preferably, the magnetic mass comprises conductive bars and two short-circuit rings so as to form a squirrel cage, the short-circuit rings not being compacted between the fastening flanges and the magnetic mass.

According to another aspect, proposed is an assembly of rotors in series comprising at least two rotors with non-through shaft as previously defined, wherein a coupling flange of one rotor is fastened to a coupling flange of the other rotor in order to transmit a torque between the two rotors.

Preferably, the coupling flanges of the rotors are fastened to one another by means of an intermediate shaft comprising two coupling flanges.

Advantageously, the intermediate shaft is supported by a bearing.

According to still another aspect, proposed is a rotor with multiple magnetic masses, comprising a rotor with non-through shaft as previously defined, and at least one cylindrical magnetic mass whereof a first end is connected to the mounting flange of a third half-shaft in a single piece and the second end is connected to a coupling flange of the rotor in order to transmit a torque between the magnetic masses.

According to still another aspect, proposed is a rotary electrical machine comprising a rotor with non-through shaft, an assembly of rotors in series or a rotor with multiple magnetic masses as previously defined.

Other features and advantages of the invention will emerge on reading the following description of embodiments of the invention, provided solely by way of non-limiting examples and with reference to the drawings where:

FIG. 1, which has already been mentioned, illustrates an industrial facility comprising a rotary electrical machine according to the state of the art;

Figure 1:
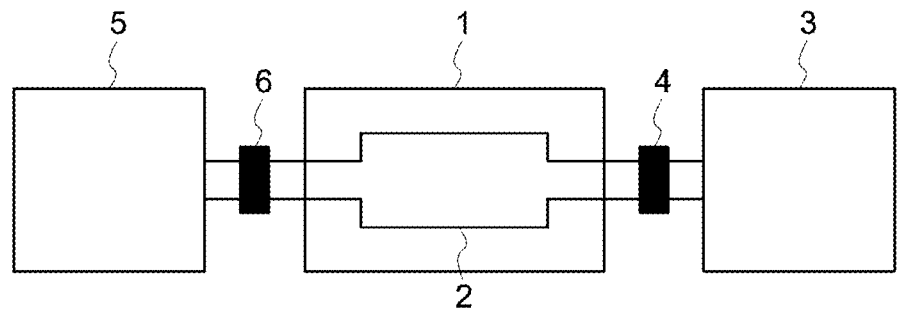
Figure 2:
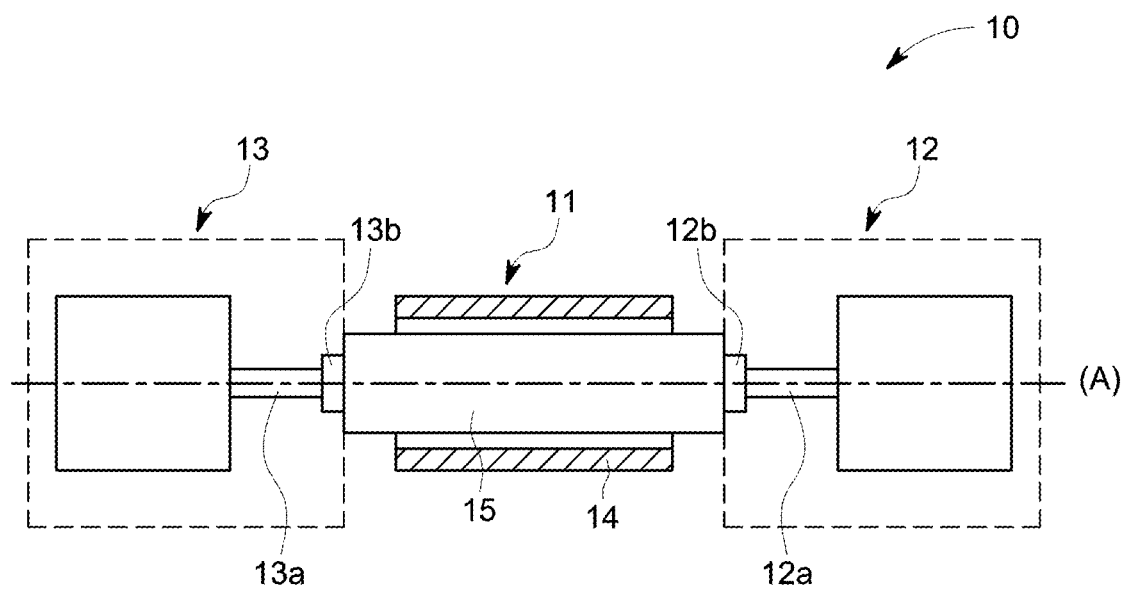
FIG. 2 shows a first embodiment of an industrial facility.

Reference is made to FIG. 2 which shows a first embodiment of an industrial facility 10 comprising a rotary electrical machine 11 whereof a first end of the rotor 15 is connected to a first mechanical system 12 and a second end of the rotor is connected to a second mechanical system 13.

The rotary electrical machine 11 further comprises a stator 14 in which a rotor 15 is inserted comprising a non-through shaft with a central axis (A).

The rotary electric machine 11 can be a machine of the asynchronous type with wound rotor, asynchronous with squirrel cage or synchronous whereof the power supply of the rotor is preferably done by rings and brushes.

The first and second mechanical systems 12 and 13 each comprise a shaft 12a and 13a each comprising a coupling flange 12b and 13b.

The coupling flanges 12b and 13b are connected to respective ends of the rotor 15 in order to transmit a mechanical torque between the rotor 15 and the mechanical systems 12 and 13.

The first mechanical system 12 is for example a gas turbine and the second mechanical system 13 is for example a compressor consuming the torque supplied by the gas turbine.

If the rotary electrical machine 11 operates in motor mode, the second mechanical system 13 receives on its shaft 13a a torque equal to the sum of the torques generated by the machine 11 and the first mechanical system 12, the rotor 15 being sized to transmit the torques generated by the machine and the gas turbine, for example a torque up to a million N·m.

If the rotary electrical machine 11 is operating in generator mode, the torque generated by the first mechanical system 12 is transmitted to the second mechanical system 13 via the rotor 15.

Figure 3:
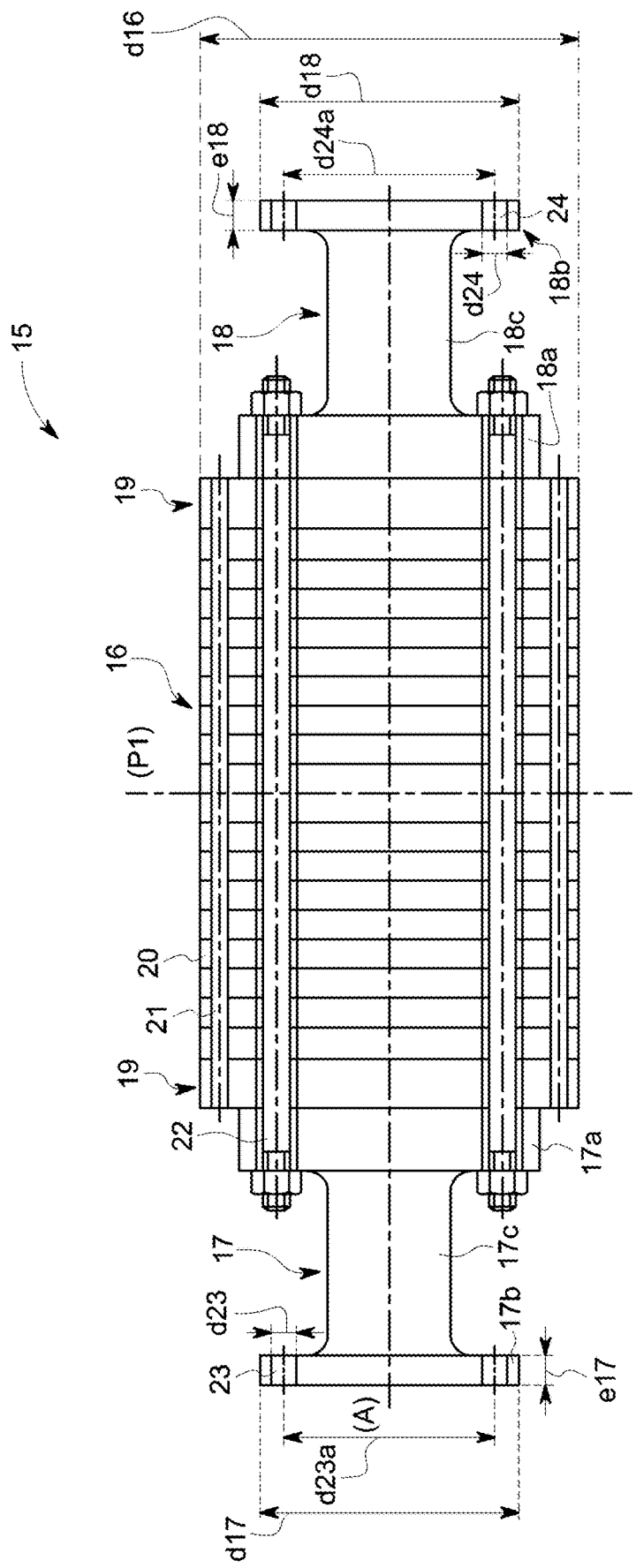
FIG. 3 shows a first embodiment of a rotor with non-through shaft.

Reference will be made to FIG. 3 which illustrates an axial sectional view of a first embodiment of the rotor 15 with non-through shaft for an asynchronous rotary electrical machine with squirrel cage.

The rotor 15 with non-through shaft comprises a cylindrical magnetic mass 16 gripped by two half-shafts 17 and 18.

The magnetic mass 16 has an outer diameter d16.

The half-shafts 17 and 18 each comprise a mounting flange 17a and 18a connected to one end of the magnetic mass 16, and a coupling flange 17b and 18b located opposite the mounting flange 17a and 18a and connected to the corresponding mechanical system 12 or 13.

Each half-shaft 17 and 18 is made in a single piece. The coupling flange 17b and 18b is not attached on the half-shaft 17 and 18.

As a result, each coupling flange can transmit by material continuity a torque of higher value than in the case of a half-shaft comprising a coupling flange attached and secured to the half-shaft for example by brazing or keying.

The half-shafts 17 and 18 are for example obtained by forging or molding and are for example made from steel.

Each half-shaft 17 and 18 further comprises a median shaft 17c and 18c between the mounting flange 17a or 18a and the coupling flange 17b or 18b.

Each median shaft 17c and 18c can be maintained in rotation by a bearing (not shown) or without a bearing if each shaft 12a and 13a is supported by a bearing.

The coupling flanges 17b and 18b are cylindrical and respectively comprise an outer diameter d17 and d18.

The outer diameter d17 and d18 of at least one coupling flange 17 and 18 is smaller than or equal to the outer diameter d16 of the magnetic mass 16 such that the rotor 15 can be inserted into the stator 14 of the electrical machine 11 without disassembling the stator or without inserting the rotor 15 into a stator comprising several assembled parts that are able to be disassembled.

The half-shafts 17 and 18 are identical.

As a result, the rotor 15 is symmetrical relative to a plane (P1) perpendicular to the rotation axis (A) and passing through a plane of symmetry of the magnetic mass 16.

The specific modes of the rotor 15 are not duplicated, the rotor 15 including fewer specific modes than in the case of different half-shafts making it possible to increase the range of usable rotation speeds in damaging the rotor 15.

Furthermore, the rotary electrical machine 11 can be moved angularly by an angle of 180° for example in order to optimize the passage of cables connecting the stator to a supply device. Since the rotor 15 is symmetrical, the two flanges 17b and 18b are in the same location allowing coupling to the mechanical systems 12 and 13 when the machine 11 has been moved angularly by 180°.

Furthermore, the magnetic mass 16 comprises two short-circuit discs 19 gripping compacted magnetic sheets 20 and conductive bars 21 housed in the magnetic sheets 20 and the short-circuit discs 19 such that the short-circuit discs 19 and the conductive bars 21 form a squirrel cage.

Tie rods 22 are distributed uniformly over a diameter of the magnetic mass 16 so as to keep the magnetic sheets 20 compacted between the half-shafts 17 and 18.

The tie rods 22 pass through smooth holes positioned in the half-shafts 17 and 18, and comprise a nut at each end so as to keep the magnetic sheets 20 compacted.

Figure 4:
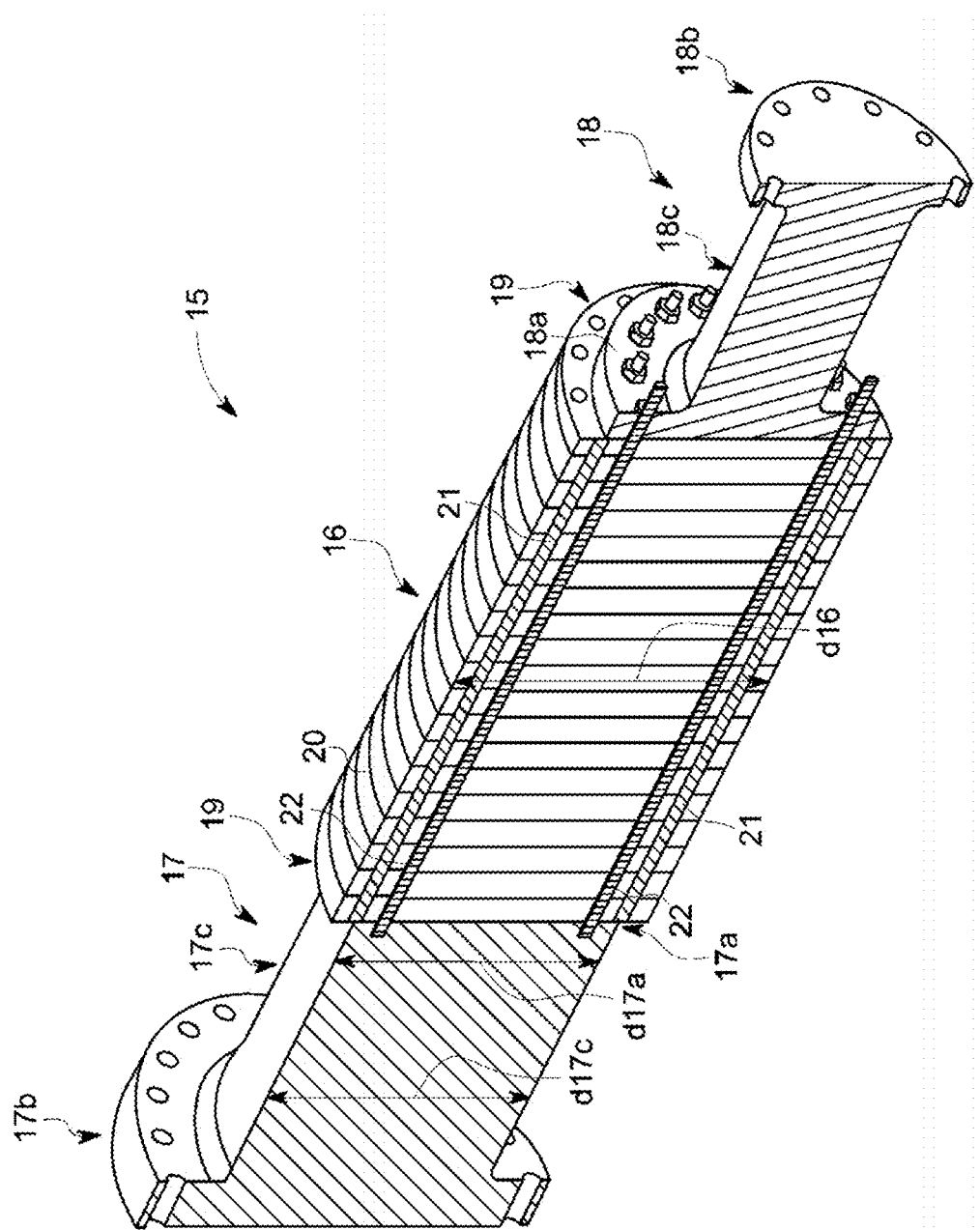
FIG. 4 shows a second embodiment of a rotor with non-through shaft.

According to a second embodiment of the rotor 15 shown in FIG. 4, the diameter d17c of the median shaft 17c is chosen such that it is larger than the implantation diameter of the tie rods 22 such that one end of each tie rod 22 is engaged in a tapping of the median shaft 17c, the median shaft 17c comprising as many tappings distributed over a diameter of the median shaft as there are tie rods 22. The outer diameter d17a of the mounting flange 17a is equal to the diameter d17c of the median shaft 17c.

In a variant, the magnetic mass 16 comprises compacted metal plates replacing the compacted magnetic sheets.

The thickness of the magnetic sheets 20 is preferably less than 2 mm, preferentially 0.65 mm, for example 0.5 mm.

The thickness of the metal plates is preferably greater than 5% of the outer diameter d16 of the magnetic mass 16.

According to another variant, the metal plates are connected to one another by screws embedded in the plates, and the metal plates located at the ends are connected to the half-shafts 17 and 18 by screws embedded in the end plates.

Each coupling flange 17b and 18b comprises through holes 23 and 24 distributed over a diameter to accommodate fastening means so as to transmit a torque.

Preferably, the through holes 23 and 24 are distributed uniformly over the diameter and/or each coupling flange 17b and 18b comprises an even number of through holes 23 and 24.

Each coupling flange 17b and 18b preferably comprises between 6 and 48 through holes.

The centers of the through holes 23, 24 are distributed uniformly over a same diameter d23a, d24a smaller than or equal to 0.9 times the outer diameter d17, d18 of the coupling flange 17, 18.

The through holes 23 and 24 preferably have a diameter d23 and d24 smaller than or equal to 0.1 times the outer diameter d17 and d18 of the corresponding coupling flange 17 and 18.

The coupling flanges 17 and 18 preferably have a thickness e17 and e18 smaller than or equal to 0.2 times the outer diameter d17 and d18 of the corresponding coupling flange 17 and 18.

The through holes 23 and 24 are smooth holes.

The fastening means comprise bolts or threaded rods comprising a nut at each of their ends such that the coupling flanges of the half-shafts 17 and 18 are secured to the coupling flanges of the mechanical systems 12 and 13 for transmitting torque.

According to a second embodiment of the through holes 23 and 24, the latter comprise tapped holes and the through holes of the flanges of the mechanical systems are smooth. Screws passing through the smooth holes cooperate with the tappings so as to transmit a torque between the rotor 15 and the mechanical systems 12 and 13.

Figure 5:
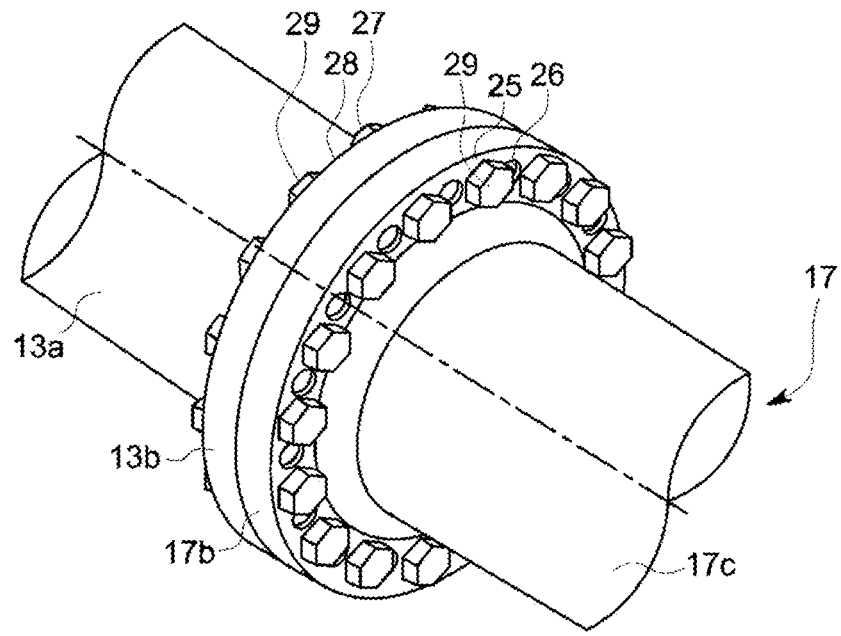
FIGS. 5 and 6 show a third embodiment of the coupling flange.
Figure 6:
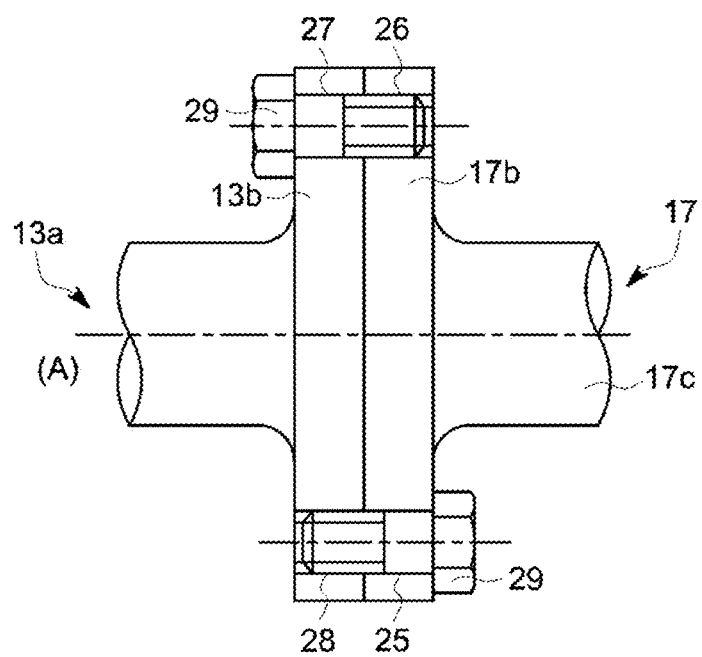

According to a third embodiment of the through holes 23 shown in FIGS. 5 and 6, the coupling flange 17b comprises through holes 23 that are alternately smooth 25 and tapped 26, and the coupling flange 13b of the second mechanical system 13 comprises through holes that are alternately smooth 27 and tapped 28 arranged such that a smooth hole 25 of the flange 17b is coaxial to a tapped hole 28 of the flange 13d, and a tapped hole 26 of the flange 17b is coaxial to a smooth hole 27 of the flange 13b.

Screws 29 each pass through a smooth hole 27, 25 of a flange 13b, 17b and each screw is engaged in a tapped hole 26, 28 of a flange 17b, 13b.

Of course, the coupling flange 18b can comprise through holes 24 according to the third embodiment cooperating with the coupling flange 12b of the first mechanical system 12.

FIG. 5 shows a partial view of the half-shaft 17 comprising the coupling shaft 17b and the median shaft 17c, the shaft 13a comprising the coupling shaft 13b and the screws 29, and FIG. 6 shows a partial sectional view in an axial direction of FIG. 5.

The heads of the screws 29 are arranged alternatively on the side of the median shaft 17c and the shaft 13a making it possible to reduce the angular distance separating two adjacent through holes so as to increase the number of screws 29 to increase the maximum torque transmitted through the coupling flanges 13b and 17b.

According to other embodiments, the two coupling flanges can include through holes of different types or the same type, the two coupling flanges 17b and 18b being designed so as to cooperate with the coupling flanges 13b and 12b of the mechanical systems 13 and 12, or the reverse if the rotor 15 is symmetrical and moved angularly by an angle of 180°.

For example the coupling flange 17b can include smooth holes and the coupling flange 18b can include tapped holes or smooth and tapped holes, as previously described.

Figure 7:
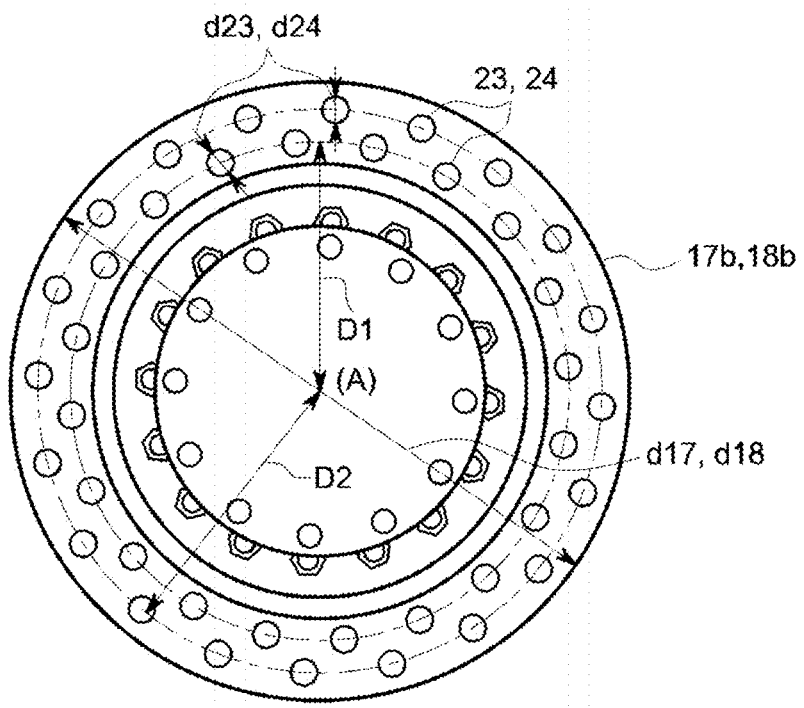
FIG. 7 shows a fourth embodiment of the coupling flange.

According to a fourth embodiment of the coupling flange 17b, 18b illustrated in FIG. 7, the centers of the through holes 23, 24 of the coupling flange 17b, 18b are distributed uniformly in staggered rows over two different diameters D1 and D2 of the coupling flange 17b, 18b, the diameter D2 being larger than the diameter D1, the through holes 23, 24 preferably being arranged in even numbers on each of the diameters D1 and D2.

Preferably, the diameter D2 is smaller than or equal to 0.9 times the outer diameter d17, d18 of the coupling flange 17*b*, 18*b*, and the diameter D1 of the second row of through holes 23, 24 is preferably smaller than or equal to 0.8 times the outer diameter d17, d18 of the coupling flange 17*b*, 18*b*.

The diameter of each through hole d23, d24 is preferably smaller than or equal to 0.1 times the outer diameter d17, d18 of the coupling flange 17*b*, 18*b*.

Of course, the through holes 23, 24 can be distributed over at least three different diameters of the coupling flange 17*b*, 18*b*, to transmit more torque.

The embodiments of the through holes of the coupling flanges 17*b* and 18*b* previously described can of course be combined.

Figure 8:
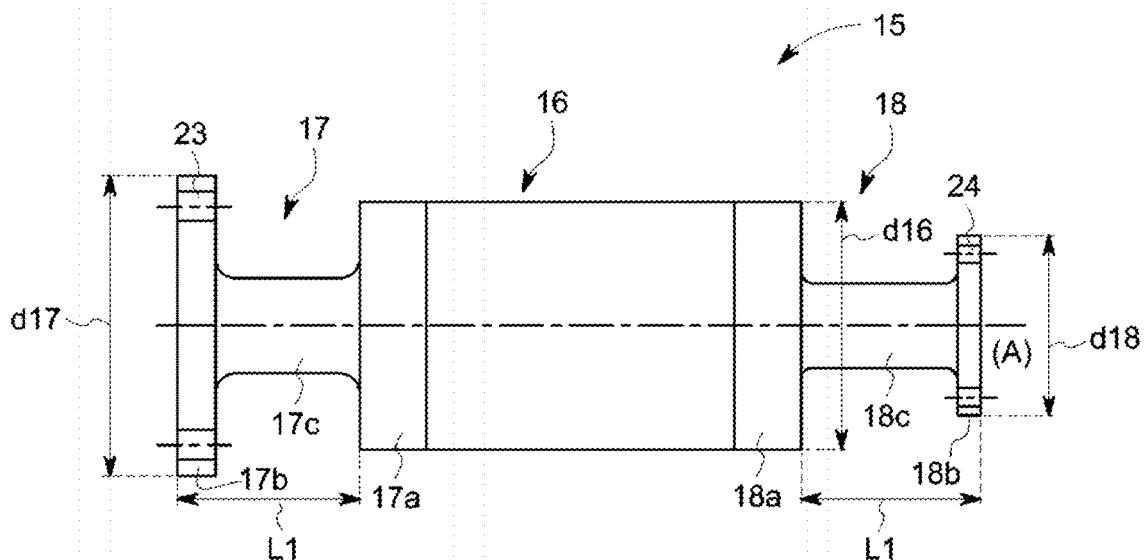
FIG. 8 shows a third embodiment of the rotor with non-through shaft.

FIG. 8 shows a view of a third embodiment of the rotor 15 with a non-through shaft.

The magnetic mass 16 is shown gripped by the half-shafts 17 and 18.

This embodiment differs from the first embodiment of the rotor 15 in that the outer diameter d18 of the coupling flange 18*b* is smaller than the outer diameter d17 of the coupling flange 17*b*, the outer diameter d17 of the coupling flange 17*b* being larger than the outer diameter d16 of the magnetic mass 16.

The outer diameter d18 of the coupling flange 18*b* is smaller than the outer diameter d16 of the magnetic mass 16 so as to insert the rotor 15 into the stator 14 without disassembling the stator.

Figure 9:
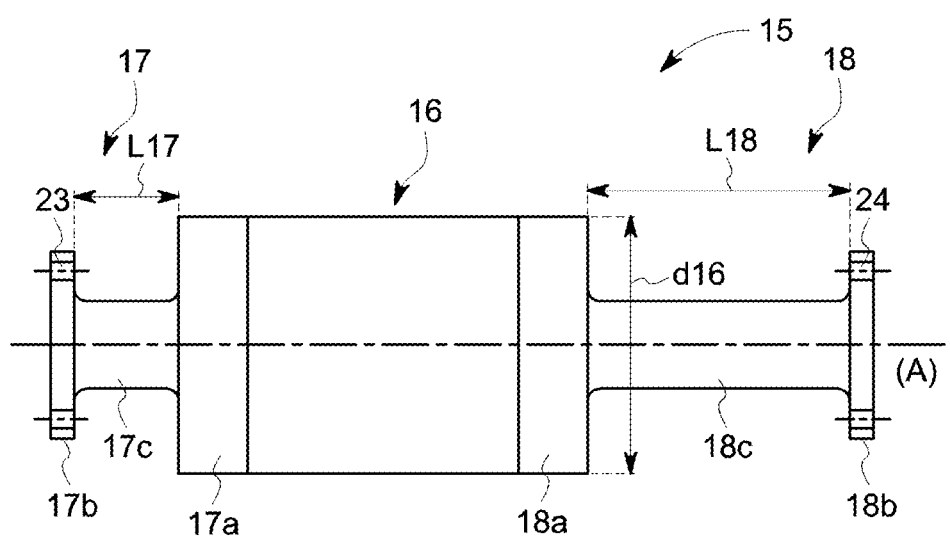
FIG. 9 shows a fourth embodiment of the rotor with non-through shaft.

FIG. 9 shows a view of a fourth embodiment of the rotor 15 with a non-through shaft.

The magnetic mass 16 is shown gripped by the half-shafts 17 and 18.

This embodiment differs from the first embodiment of the rotor 15 in that the median shafts 17*c* and 18*c* respectively connecting the fastening flanges 17*a* and 18*a* and the coupling flanges 17*b* and 18*b* are of different lengths L17 and L18.

Of course, the second and third embodiments of the rotor 15 can be combined.

Figure 10:
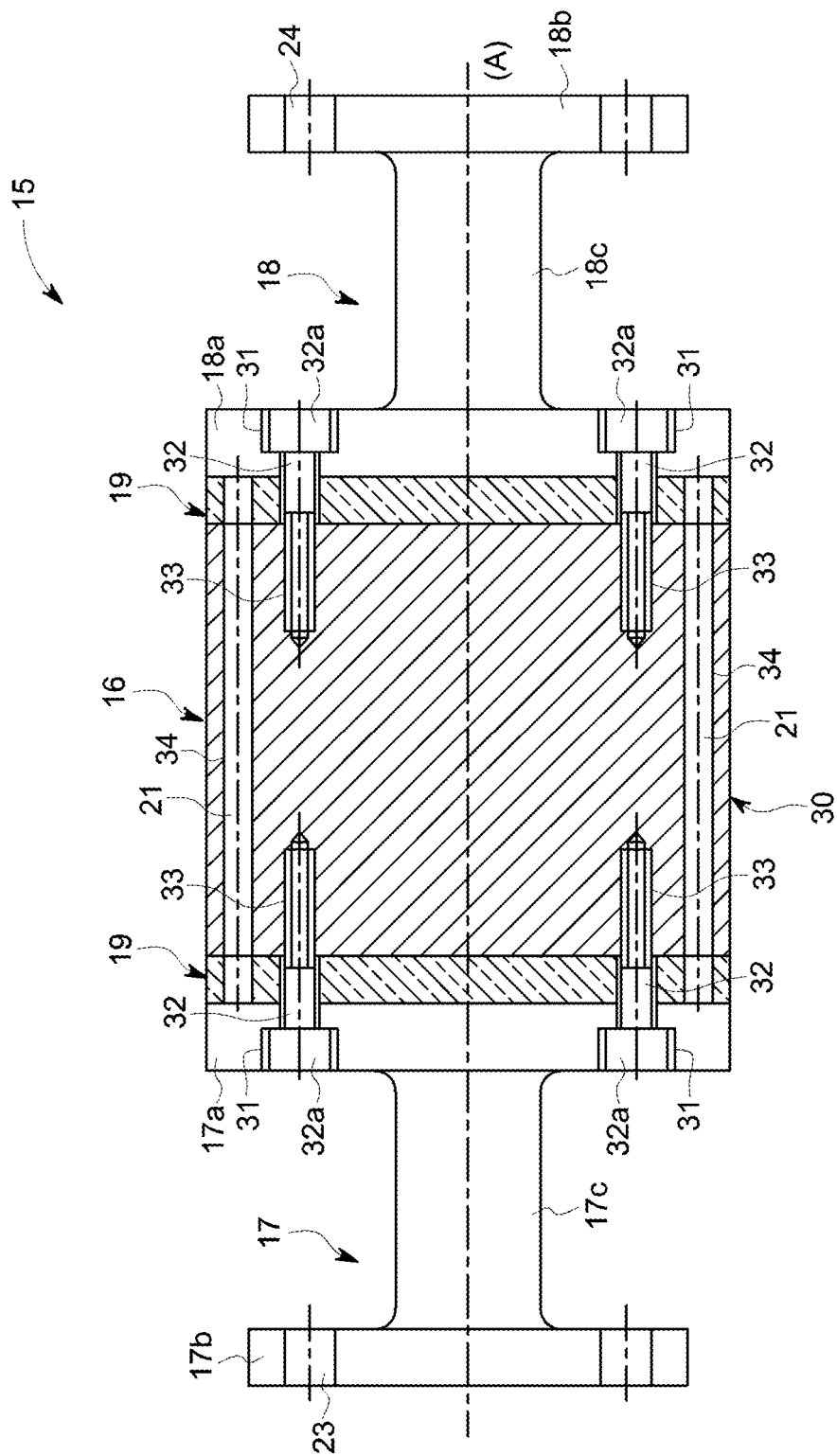
FIG. 10 shows a fifth embodiment of the rotor with non-through shaft.

FIG. 10 illustrates a partial sectional view in an axial direction of a fifth embodiment of the rotor 15.

This embodiment differs from the first embodiment illustrated in FIG. 3 in that the magnetic mass 16 comprises a monobloc metal body 30 and the fastening flanges 17*a* and 18*a* further comprise counterbores.

The rotor 15 further includes screws 32 distributed uniformly over a diameter of each half-shaft 17 and 18.

Each screw 32 is engaged in a tapping 33 of the monobloc metal body 30 so as to keep the short-circuit discs 19 and the metal body 30 compacted between the half-shafts 17 and 18.

Each screw head 32*a* is housed in a counterbore 31 of the half-shaft 17 and 18.

In a variant that is not shown, the fastening flanges 17*a* and 18*a* do not comprise a counterbore.

The monobloc metal body 30 further comprises housings 34 accommodating the conductive bars 21 distributed uniformly over a diameter of the monobloc metal body 30 forming a squirrel cage with the short-circuit discs 19.

Figure 11:
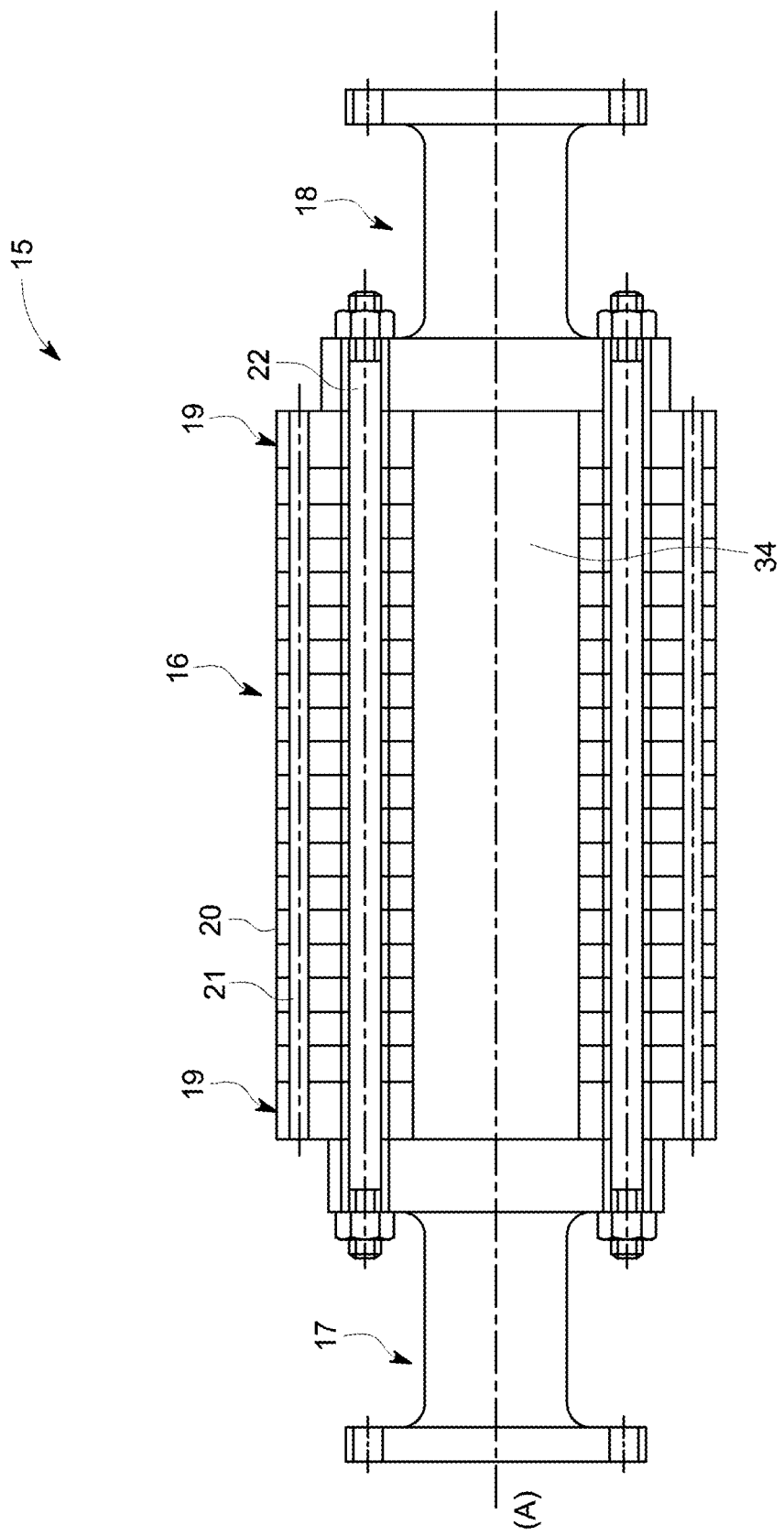
FIG. 11 shows a sixth embodiment of the rotor with non-through shaft.

According to a sixth embodiment of the rotor 15 illustrated in FIG. 11 showing a sectional view in an axial direction of the rotor 15, the magnetic sheets 20 and the short-circuit discs 19 comprise a central recess such that the magnetic mass 16 comprises a central recess 34.

This embodiment of the magnetic mass 16 is allowed when the peripheral speed of the rotor 15 is less than 180 m/s such that the concentration of the mechanical stresses generated during the rotation of the rotor 15 on the perimeter of the central recess 34 of each of the magnetic sheets 20 is not able to damage the magnetic mass 16.

The central recess 34 of the magnetic mass 16 makes it possible to lighten the rotor mass so as to increase the critical speed of the rotor 15.

The central recess does not include a through shaft or central tie rod providing the compacting of the magnetic mass 16.

The short-circuit discs 19 are preferably made from copper or alloyed copper.

The short-circuit discs 19 generally have an elastic limit lower than that of the magnetic sheets 20.

To prevent the short-circuit discs 19 from crossing their elastic limit, in a variant that is not shown, the short-circuit discs 19 do not comprise a central recess.

Figure 12:
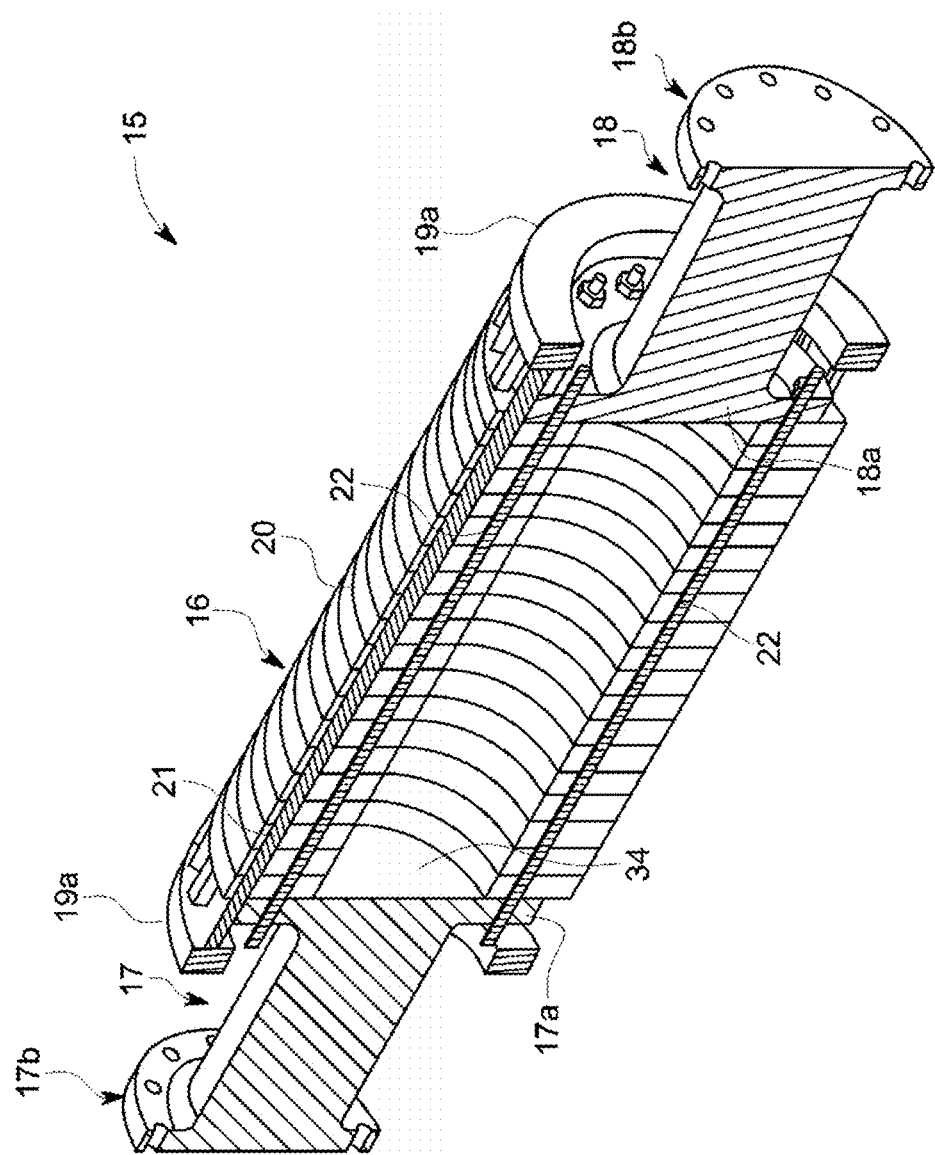
FIG. 12 shows a seventh embodiment of the rotor with non-through shaft.

A seventh embodiment of the rotor 15 is shown in FIG. 12 and differs from the sixth embodiment illustrated in FIG. 11 in that the magnetic mass 16 does not include a short-circuit disc 19.

The rotor 15 includes short-circuit rings 19*a* that are not compacted between the fastening flanges 17*a* and 18*a* and the magnetic mass 16.

The short-circuit rings referenced 19*a* and the conductive bars 21 form a squirrel cage.

In a variant that is not shown, the magnetic mass 16 does not comprise a central recess.

Although the embodiments of the rotor 15 with a non-through shaft previously described are asynchronous squirrel cage rotors, the invention also applies to a wound asynchronous rotor with a non-through shaft. In this case the conductive bars are replaced by notches housing coils connected to each other.

The invention also applies to a wound synchronous rotor with a non-through shaft preferably supplied by a device with rings and brushes. The conductive bars can then be replaced by notches housing coils connected for example to the rings.

Figure 13:
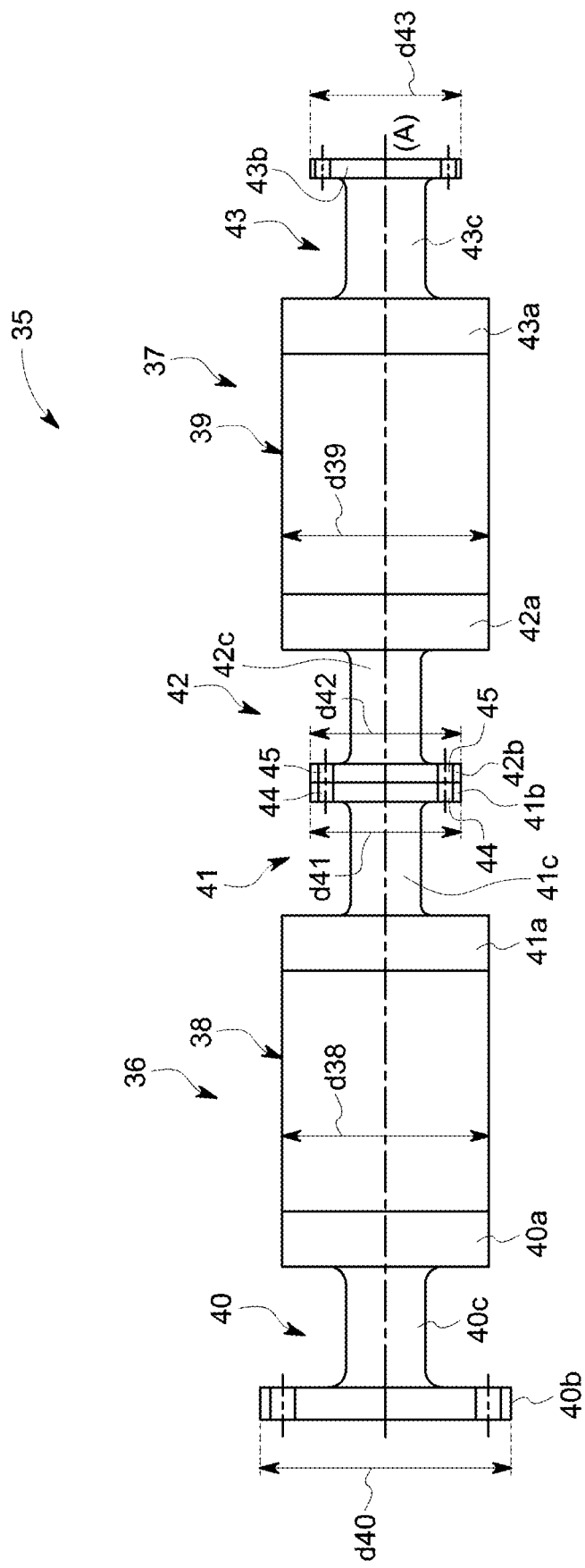
FIG. 13 shows a first embodiment of an assembly of rotors in series.

Reference is made to FIG. 13 which shows a first embodiment of an assembly of rotors in series 35 comprising two rotors 36 and 37 comprising a non-through shaft similar to the rotor 15.

The first and second rotors 36 and 37 each comprise a magnetic mass 38 and 39 gripped between two half-shafts 40, 41 and 42, 43, each half-shaft being in a single piece and similar to the half-shafts previously described.

The magnetic masses 38 and 39 are identical, for example of the monobloc type and of the same dimensions.

The first half-shaft 40 of the first rotor 36 comprises a mounting flange 40*a* connected to the magnetic mass 38 and a coupling flange 40*b* connected by a median shaft 40*c* to the mounting flange, the outer diameter d40 of the coupling flange 40*b* being larger than the outer diameter d38 and d39 of the magnetic masses 38 and 39 of the first and second rotors 36 and 37.

The second half-shaft 41 of the first rotor 36 comprises a mounting flange 41*a* connected to the magnetic mass 38 and a coupling flange 41*b* connected by a median shaft 41*c* to the mounting flange, the outer diameter d41 of the coupling flange 41*b* being smaller than the outer diameter d38 and d39 of the magnetic masses 38 and 39 of the first and second rotors 36 and 37.

The first half-shaft 42 of the first rotor 37 comprises a mounting flange 42*a* connected to the magnetic mass 39 and a coupling flange 42b connected by a median shaft 42c to the mounting flange, the outer diameter d42 of the coupling flange 42b being smaller than the outer diameter d38 and d39 of the magnetic masses 38 and 39 of the first and second rotors 36 and 37.

The coupling flanges 41b and 42b of the second half-shaft 41 of the first rotor 36 and of the first half-shaft 42 of the second rotor 37 are sized to be secured, for example by bolts passing in the coaxial through holes 44 and 45 of the coupling flanges 41b and 42b in order to transmit a torque between the two rotors 36 and 37.

The second half-shaft 43 of the first rotor 37 comprises a mounting flange 43a connected to the magnetic mass 39 and a coupling flange 43b connected by a median shaft 43c to the mounting flange, the outer diameter d43 of the coupling flange 43b being smaller than the outer diameter d38 and d39 of the magnetic masses 38 and 39 of the first and second rotors 36 and 37.

The outer diameters of the coupling flanges d40, d41, d42, and d43 are chosen such that the assembly of rotors in series 35 can be inserted into a stator 14 comprising two sub-stators each cooperating with a rotor 36 and 37 without disassembly of the stator 14 and such that each rotor 36 and 37 generates an electromagnetic torque.

For example, the diameters referenced d41, d42 and d43 are smaller than the diameters referenced d38 and d39, and the diameter referenced d40 is larger than the diameters referenced d38 and d39.

In a variant that is not shown, the diameters referenced d40, d41 and d42 are smaller than the diameters referenced d38 and d39, and the diameter referenced d43 is larger than the diameters referenced d38 and d39. The insertion direction of the assembly of rotors in series 35 in the stator is reversed relative to the previous example.

According to still another variant that is not shown, the diameters referenced d40, d41, d42 and d43 are smaller than the diameters referenced d38 and d39 allowing an insertion of the assembly of rotors in series 35 into the stator in both directions.

According to other embodiments, the magnetic masses 36 and 37 can have different sizes and/or types for example comprising magnetic sheets 20 or a stack of metal plates.

Figure 14:
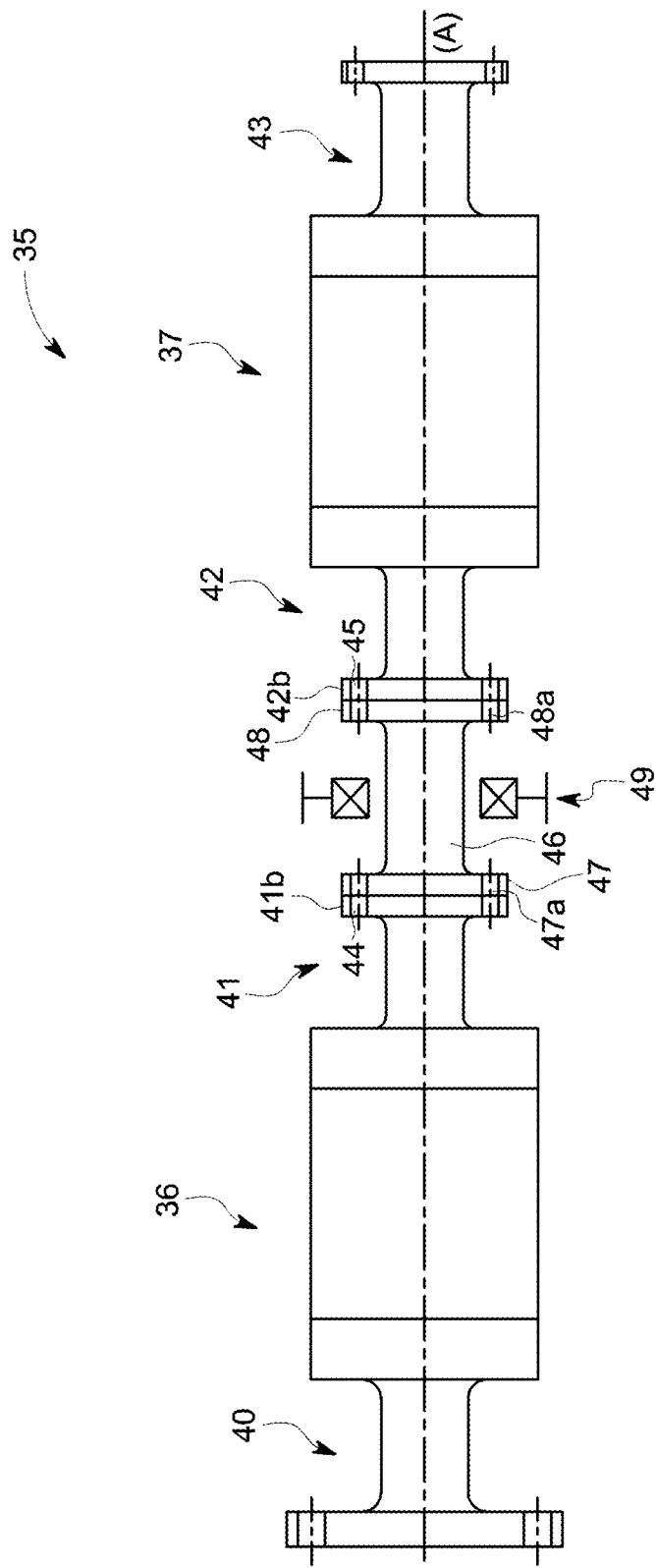
FIG. 14 shows a second embodiment of an assembly of rotors in series.

According to a second embodiment, the assembly of rotors in series 35 can further comprise an intermediate shaft 46 positioned between the coupling flanges 41b and 42b of the second half-shaft 41 of the first rotor 36 and the first half-shaft 42 of the second rotor 37 so as to transmit a torque between the two rotors 36 and 37 as illustrated in FIG. 14.

The intermediate shaft 46 comprises at each of its ends a coupling flange 47 and 48 cooperating with the coupling flanges 41b and 42b of the rotors 36 and 37.

The coupling flanges 47 and 48 of the intermediate shaft 46 each comprise through holes 47a and 48a cooperating with the through holes 44 and 45 of the coupling flanges 41b and 42b to accommodate bolts for example.

The intermediate shaft 46 makes it possible to separate the rotors 36 and 37 from one another so as to create a space simplifying the maintenance of the rotary electrical machine 11.

Depending on the geometry and/or the material of the intermediate shaft 46, it is possible to adjust the critical speed of the assembly of rotors in series 35 so as to modify the frequency of the specific torsion and flexion modes of the assembly 35.

Furthermore, since the critical speed can be modified by adjusting the geometric characteristics or the material of the intermediate shaft 46, it suffices to produce two identical rotors 36 and 37 and to connect them with an intermediate shaft sized in order to adjust the critical speed of the assembly 35 to the desired critical speed.

It is also easy to modify the critical speed of the assembly 35 during the lifetime of the machine 11 by modifying the characteristics of the intermediate shaft 46.

The intermediate shaft can be maintained in rotation by a bearing 49.

The maintenance of the intermediate shaft 46 by the bearing 49 makes it possible to increase the critical flexion speed of the assembly 35 of rotors in series.

The assembly 35 of rotors in series can comprise more than two rotors in series, certain adjacent rotors being connected by an intermediate shaft that may or may not be maintained by bearing, the stator comprising as many sub-stators as rotors and each cooperating with a rotor so as to generate an electromagnetic torque.

Figure 15:
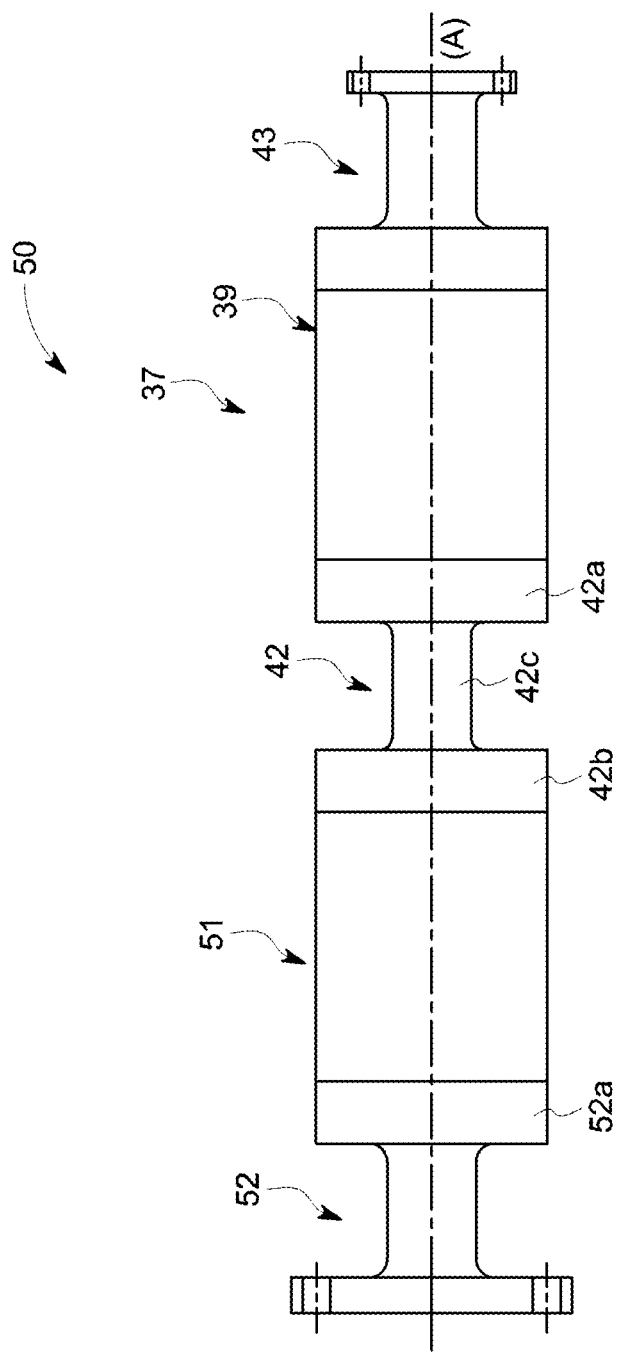
FIG. 15 shows an exemplary embodiment of a rotor with multiple magnetic masses.

Reference is now made to FIG. 15 which illustrates an exemplary embodiment of a rotor with multiple magnetic masses 50.

The rotor with multiple magnetic masses 50 comprises a rotor 37 as previously described and a second cylindrical magnetic mass 51 the ends of which are connected on the one hand to the coupling flange 42b of the first half-shaft 42 of the rotor 37, and, on the other hand, to the mounting flange 52a of a third half-shaft 52 similar to the half-shafts 42 and 43.

The magnetic masses 39 and 51 are identical, but they can be of different types and/or different dimensions.

The outer diameter of the magnetic masses 39 and 51, and the outer diameter of the half-shafts 42, 43 and 52 are sized such that the rotor 50 can be inserted into the stator 14 which comprises as many sub-stators as magnetic masses so as to generate an electromagnetic torque.

In a variant that is not shown, the rotor with multiple magnetic masses 50 comprises a support bearing to maintain the rotation of the median shaft 42c.

The support bearing makes it possible to increase the critical flexion speed of the rotor with multiple magnetic masses 50.

For example, the rotor with multiple magnetic masses can comprise more than two magnetic masses, the magnetic masses being separated by half-shafts that may or may not be maintained by bearings.

The rotary electrical machine comprising the assembly of rotors in series or the rotor with multiple magnetic masses makes it possible to develop an electrical power greater than that of a machine comprising a single rotor while respecting the maximum sizing values of rotary electrical machines, for example while not exceeding a peripheral speed of the rotor of 300 m/s and while controlling the size characteristics of the rotary electrical machine such that it is for example transportable and easy to disassemble for easier maintenance.

Of course, the rotary electrical machine comprising the rotor 15, the assembly of rotors in series 35 or the rotor with multiple magnetic masses 50 can operate in motor or generator mode.

According to other embodiments that are not shown, the outer diameter of the coupling flanges of an element comprising the rotor 15, the assembly of rotors in series 35 or the rotor with multiple magnetic masses 50 is greater than the diameter of their magnetic mass. In these embodiments, the stator housing one of these elements comprises several parts assembled around the element such that the element is arranged in the stator without being disassembled, the stator and the element forming a rotary electrical machine.

The rotor 15, the assembly of rotors in series 35 and the rotor with multiple magnetic masses 50 make it possible to transfer a torque up to one million N·m.

What is claimed is:

1. A rotor with a non-through shaft for an electrical machine, the rotor comprising:
    two half-shafts; and
    a cylindrical magnetic mass gripped between, and directly connected to, the two half-shafts, each half-shaft being formed in a single piece and comprising a mounting flange connected to the cylindrical magnetic mass at one end;
    wherein each half-shaft of the two half-shafts comprises a coupling flange integrally combined therewith at an outer side thereof;
    wherein the half-shaft is located opposite each mounting flange;
    wherein the coupling flange comprises through holes distributed in staggered rows over at least two different diameters of the coupling flange to accommodate fastening components so as to transmit a torque;
    wherein (i) a first diameter of the at least two different diameters of the coupling flange contains a first row of through holes and is smaller than or equal to 0.9 times an outer diameter of the coupling flange and (ii) a second diameter of the at least two different diameters of the coupling flange contains a second row of through holes and is smaller than or equal to 0.8 times the outer diameter of the coupling flange;
    wherein a double torque transmission occurs at each side of the rotor; and
    wherein the through holes are alternately smooth and tapped such that a smooth hole of the coupling flange is coaxial to a tapped hole of another coupling flange and a tapped hole of the coupling flange is coaxial with a smooth hole of the other coupling flange, and the fastening components each pass through the smooth hole and are engaged in a tapped hole of corresponding coupling flanges, and each fastening component includes a first side which is arranged alternatively in adjacent through holes along opposite sides of the coupling flange, wherein an angular distance between the adjacent through increases the torque transmitted.

2. The rotor according to claim 1, wherein each half-shaft of the two half-shafts comprises a median shaft, and wherein the mounting flange and the coupling flange of each half-shaft of the two half-shafts are connected by the median shaft.

3. The rotor according to claim 2, wherein the median shafts have different lengths.

4. The rotor according to claim 3, wherein the coupling flanges have a different diameter.

5. The rotor according to claim 4, wherein an outer diameter of at least one coupling flange is smaller than or equal to an outer diameter of the cylindrical magnetic mass.

6. The rotor according to claim 2, wherein the two half-shafts are substantially identical.

7. The rotor according to claim 1, wherein the cylindrical magnetic mass comprises compacted magnetic sheets.

8. The rotor according to claim 1, wherein the cylindrical magnetic mass comprises a stack of metal plates.

9. The rotor according to claim 8, further comprising tie rods distributed uniformly over at least one diameter of the cylindrical magnetic mass to keep the cylindrical magnetic mass compacted between the two half-shafts, a diameter of at least one median shaft being greater than an implantation diameter of the tie rods, an outer diameter of the mounting flange of each half-shaft of the two half-shafts being equal to a diameter of the at least one median shaft, one end of each tie rod being engaged in a tapping of the at least one median shaft comprising tappings equal to a total number of tie rods.

10. The rotor according claim 1, wherein the cylindrical magnetic mass comprises a monobloc metal body.

11. The rotor according to claim 10, wherein the cylindrical magnetic mass comprises a central recess.

12. The rotor according to claim 11, wherein the cylindrical magnetic mass comprises conductive bars and two short-circuit rings to form a squirrel cage, wherein the two short-circuit rings not being compacted between the mounting flange of each half shaft of the two half shafts and the cylindrical magnetic mass.

13. An assembly of rotors in series comprising:
    at least two rotors according to the rotor of claim 1, wherein a coupling flange of one rotor of the at least two rotors is fastened to a coupling flange of another rotor of the at least two rotors coaxially, to transmit a torque between the two rotors.

14. The assembly of rotors in series according to claim 13, wherein the coupling flanges of the assembly of rotors are fixed to one another by means of an intermediate shaft comprising two coupling flanges.

15. The assembly of rotors in series according to claim 14, wherein the intermediate shaft is maintained by a bearing.

* * * * *